US012024939B2

(12) United States Patent
Feng et al.

(10) Patent No.: US 12,024,939 B2
(45) Date of Patent: Jul. 2, 2024

(54) SPLICING PIPE FOR INSTALLING DOOR OR WINDOW

(71) Applicant: Beijing Doorwin Construction Co., Ltd., Beijing (CN)

(72) Inventors: Youye Feng, Beijing (CN); Guangzhou Xu, Beijing (CN)

(73) Assignee: Beijing Doorwin Construction Co., Ltd., Beijing (CN)

( * ) Notice: Subject to any disclaimer, the term of this patent is extended or adjusted under 35 U.S.C. 154(b) by 24 days.

(21) Appl. No.: 18/146,371

(22) Filed: Dec. 24, 2022

(65) Prior Publication Data

US 2023/0125599 A1 Apr. 27, 2023

Related U.S. Application Data

(63) Continuation of application No. PCT/CN2021/122991, filed on Oct. 11, 2021.

(51) Int. Cl.

*E06B 3/263* (2006.01)
*E06B 1/68* (2006.01)
*E06B 3/26* (2006.01)

(52) U.S. Cl.

CPC .................. *E06B 1/68* (2013.01); *E06B 3/26* (2013.01); *E06B 3/26303* (2013.01); *E06B 3/26305* (2013.01); *E06B 2003/26312* (2013.01)

(58) Field of Classification Search

CPC ..... E06B 1/08; E06B 1/18; E06B 1/30; E06B 1/325; E06B 1/366; E06B 1/524; E06B 1/6007; E06B 1/6069; E06B 1/64; E06B 1/68; E06B 3/26; E06B 3/26301; E06B 3/26303; E06B 3/26305; E06B 3/26338; E06B 2003/26312; E06B 2003/26383

See application file for complete search history.

(56) References Cited

U.S. PATENT DOCUMENTS 4,207,717 A * 6/1980 Hubbard .................. E04B 2/96 52/771
4,397,116 A * 8/1983 Habicht .................. E06B 5/162 49/501
4,614,062 A * 9/1986 Sperr ...................... E06B 7/231 49/504
4,815,245 A * 3/1989 Gartner ............... E06B 3/26343 52/235

(Continued)

FOREIGN PATENT DOCUMENTS

GB 2413585 A * 11/2000 ............. E06B 1/366

*Primary Examiner* — Kyle J. Walraed-Sullivan

(57) ABSTRACT

A splicing pipe for installing a door or window includes a first frame profile, a second frame profile, a heat insulation strip and at least two fasteners. A first clamping groove is formed on each of two sides of the first frame profile, and a second clamping groove is formed on each of two sides of the second frame profile. The first clamping groove and the second clamping groove are both used to connect to the door or window having glass. At least one of the first frame profile and the second frame profile on the same side is provided with an installation groove, and the fastener is inserted into the installation groove. The splicing pipe provided has the advantages of simple splicing operation and easy implementation, which can not only improve the splicing speed, but also guarantee the performance of the doors or windows after being spliced.

8 Claims, 13 Drawing Sheets

(56) References Cited

U.S. PATENT DOCUMENTS

| | | | | | |
|---|---|---|---|---|---|
| 4,907,391 | A * | 3/1990 | Over | E06B 1/02 52/204.593 |
| 5,355,645 | A * | 10/1994 | Farag | E06B 3/5427 52/235 |
| 5,579,616 | A * | 12/1996 | Farag | E04B 2/96 52/311.1 |
| 5,596,851 | A * | 1/1997 | Ting | E06B 7/14 52/211 |
| 6,145,256 | A * | 11/2000 | Cittadini | E06B 7/232 49/478.1 |
| 10,227,817 | B2 * | 3/2019 | Ting | E06B 3/6715 |
| 10,718,152 | B2 * | 7/2020 | Brandes | E06B 3/26305 |
| 10,829,982 | B2 * | 11/2020 | Jones | E06B 3/5885 |
| 11,739,585 | B1 * | 8/2023 | Mazur | E06B 3/26303 52/204.5 |
| 2004/0003553 | A1 * | 1/2004 | Donoghue | E06B 3/56 52/204.5 |
| 2007/0137124 | A1 * | 6/2007 | MacDermott | E06B 1/366 52/278 |
| 2009/0313941 | A1 * | 12/2009 | Siodla | E06B 3/26303 52/656.2 |
| 2014/0053488 | A1 * | 2/2014 | Lenox | E06B 3/34 49/404 |
| 2015/0267460 | A1 * | 9/2015 | Header | E06B 3/26303 52/204.5 |
| 2017/0074027 | A1 * | 3/2017 | Rethmeier | E06B 3/26305 |
| 2018/0179804 | A1 * | 6/2018 | Fontijn | E05D 15/0686 |
| 2019/0284866 | A1 * | 9/2019 | Marinack, Jr. | E06B 3/26305 |
| 2020/0102783 | A1 * | 4/2020 | Ortuzar | E06B 3/26303 |
| 2020/0318422 | A1 * | 10/2020 | Koster | E06B 3/5864 |
| 2021/0207426 | A1 * | 7/2021 | Fielding | E06B 3/5409 |
| 2023/0383588 | A1 * | 11/2023 | Lund | E06B 1/6007 |

* cited by examiner

SPLICING PIPE FOR INSTALLING DOOR OR WINDOW

CROSS-REFERENCE TO RELATED APPLICATIONS

This application is a continuation of International Patent Application Number PCT/CN2021/122991, filed on Oct. 11, 2021, the disclosures of which are incorporated herein by reference in their entireties.

TECHNICAL FIELD

The present disclosure relates to the technical field of aluminium alloy profile installation device for building doors or windows, and more particularly to a splicing pipe for installing a door or window.

BACKGROUND

At present, a large category of styles of the prior building doors or windows are strip doors or windows with relatively large area. Such a strip door or window is formed by connecting two or more doors or windows and some connecting profiles through screws to achieve a relatively large area of the entire door or window to meet the design appearance of the building and the corresponding performance.

This kind of door or window has the main feature of large area. Since the glass-installed doors or windows are not suitable to be subjected to road transportation and vertical transportation on site, the high-efficiency and high-quality assembly and processing cannot be achieved in the factory.

The glass needs to be installed, or first removed and then re-installed on site. However, most of the prior splicing profiles and screw connection processes require the on-site construction, which results in slow installation speed and uneven installation quality. Therefore, it is highly desirable to develop a connecting profile that can realize the fast splicing of doors or windows.

SUMMARY

The present disclosure provides a splicing pipe for installing a door or window. An objective of the present disclosure is to improve the splicing speed of a connecting profile for splicing the doors or windows on the premise of ensuring the installation quality.

In an embodiment of the present disclosure, a splicing pipe for installing a door or window includes a first frame profile, a second frame profile, a heat insulation strip and at least two fasteners.

The top of the heat insulation strip is connected to the first frame profile, and the bottom of the heat insulation strip is connected to the second frame profile.

A first clamping groove is formed on each of two sides of the first frame profile, and a second clamping groove is formed on each of two sides of the second frame profile. The first clamping groove and the second clamping groove on the same side are both configured to be connected to the door or window having glass.

At least one of the first frame profile and the second frame profile on the same side is provided with an installation groove, and the fastener is inserted into the installation groove. After the splicing pipe is connected to the door or window, the fastener is arranged between the door or window and the splicing pipe, and the fastener is configured to lock and fix the door or window.

In an embodiment, an elastic sealing member is arranged on at least one of the first clamping groove and the second clamping groove on the same side. The fastener squeezes the elastic sealing member for cooperation to strengthen the connection and fixation of the door or window.

In an embodiment, the elastic sealing member is a strip sealing member.

In an embodiment, the installation groove is formed on each of two sides of the first frame profile, and the installation groove is located above the first clamping groove. An opening of the first clamping groove and an opening of the second clamping groove are both arranged toward the top of the first frame profile.

In an embodiment, a support plate is arranged on each of two sides of the second frame profile, and the door or window abuts against the support plate.

In an embodiment, the fastener is a rectangular strip fastener.

In an embodiment, the fastener is made from a hard material. At least one side of the first frame profile in contact with the fastener is provided with an engagement portion, and the engagement portion is configured to be engaged and fixed with the fastener.

In an embodiment, the engagement portion is serrated. A limiting portion is arranged on the fastener, and the limiting portion is configured to limit the position of the fastener relative to the first frame profile.

In an embodiment, the bottom of a top plate of the first frame profile is provided with the engagement portion, and a reinforcement frame is arranged on the top of the first frame profile.

In an embodiment, a supporting member is arranged in the reinforcement frame, and the supporting member is in contact with the reinforcement frame to increase the structural strength of the reinforcement frame.

The above-mentioned splicing pipe for installing the door or window is adopted. Two sides of the splicing pipe can be connected to the doors or windows having glass, that is, small doors or windows can be spliced together to obtain a large door or window. When the doors or windows having glass are spliced, it is only necessary to connect the door or window with the first clamping groove and the second clamping groove on the same side of the splicing pipe, which makes the splicing of the doors or windows on site more simple and efficient. The fastener located in the installation groove is arranged between the splicing pipe and the door or window, and can squeeze the door or window to better connect the door or window with the splicing pipe tightly, such that the door or window is prevented from loosening after being used for a long time, and the service life of the door or window is better guaranteed. After the door or window is connected to the splicing pipe, the fastener is inserted into the installation groove to realize the splicing installation of the door or window. The splicing pipe can splice the glass-installed doors or windows, and the small doors or windows can be subjected to standardized assembling in the factory, such that the performance of the doors or windows can be guaranteed. After the small glass-installed doors or windows are transported to the site, there is no need to disassemble the glass, and the splicing is performed only through the splicing pipe. In this way, the splicing process on site is greatly simplified, and the splicing efficiency of the doors or windows on site is improved. The splicing pipe provided in the present disclosure has the advantages of simple splicing operation and easy implementation, which can not only improve the splicing speed, but also guarantee the performance of the doors or windows after being spliced. Even if the installation is performed by workers with different working abilities, the splicing can basically achieve the same performance.

DETAILED DESCRIPTION OF THE EMBODIMENTS

Figure 1:
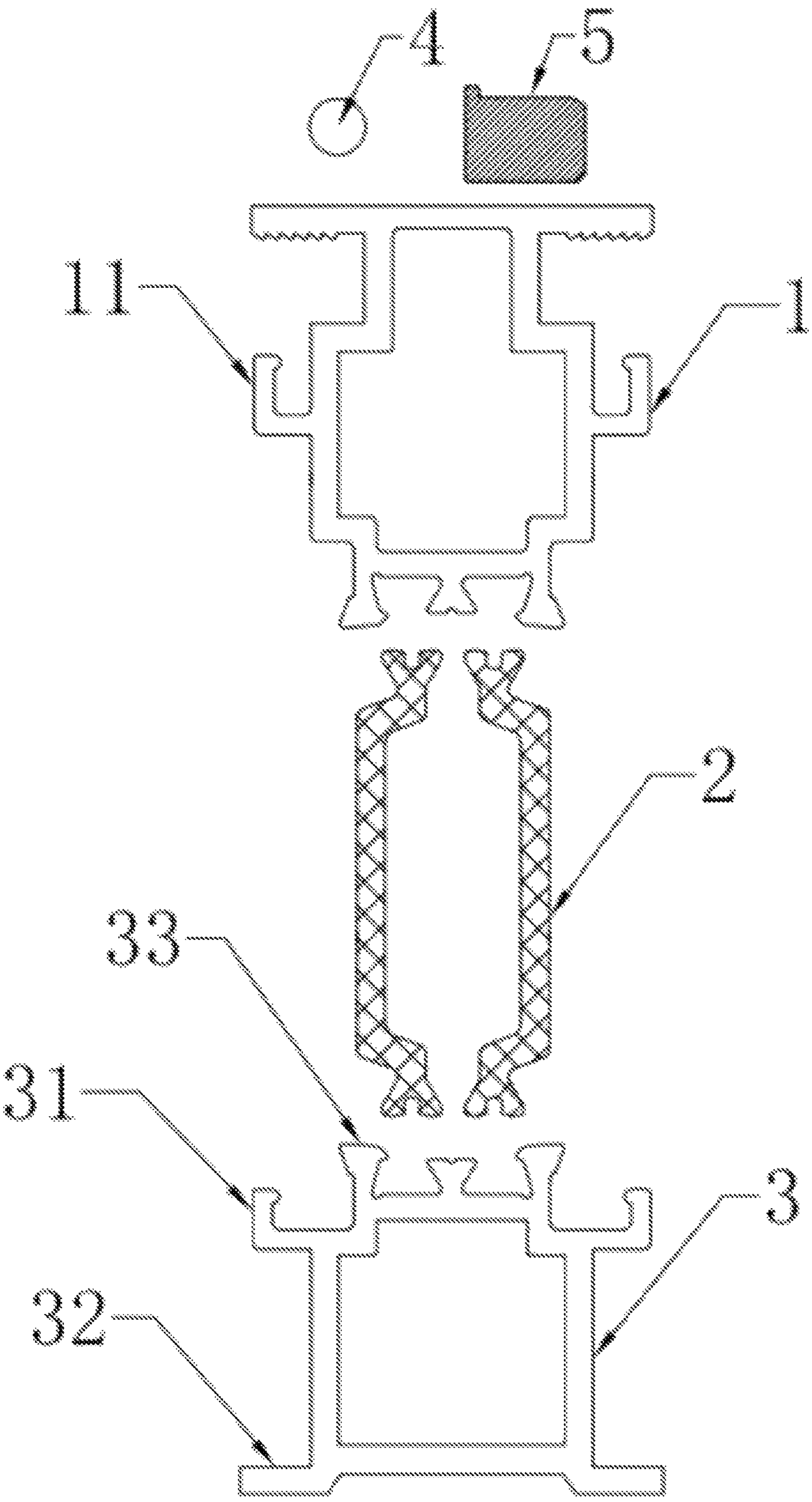
FIG. 1 is an exploded view of the structure of a splicing pipe for installing a door or window according to an embodiment of the present disclosure.
Figure 2:
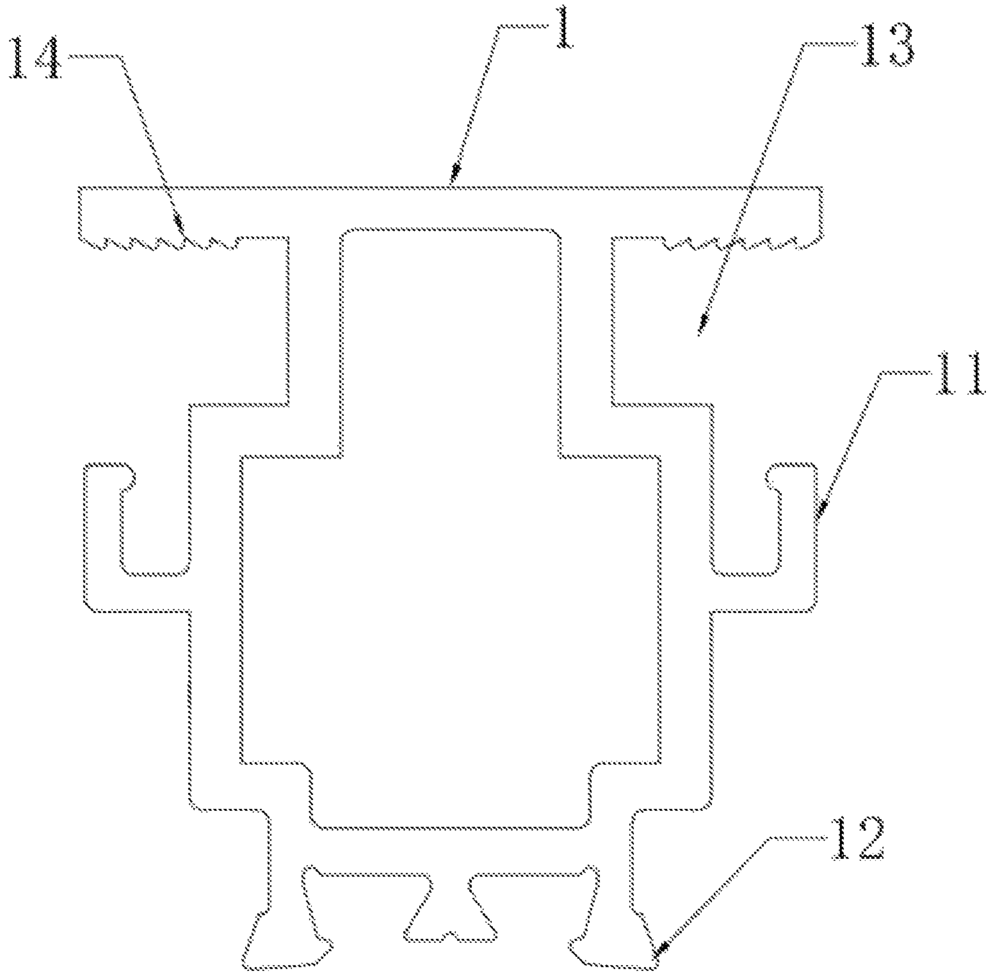
FIG. 2 is a structural schematic diagram of a first frame profile according to an embodiment of the present disclosure.
Figure 3:
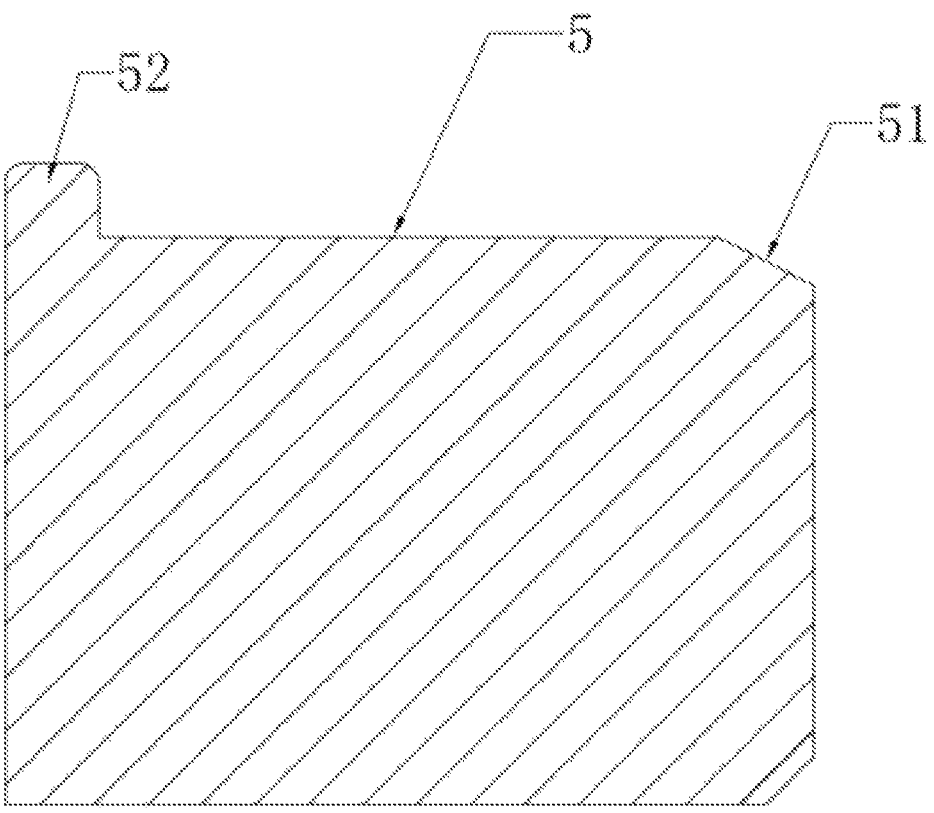
FIG. 3 is a structural schematic diagram of a fastener according to an embodiment of the present disclosure.

The present disclosure is further described in detail below through the embodiments with reference to the drawings. The similar elements in different embodiments employ the associated similar element labels. In the following embodiments, many details are described in order to enable the present disclosure to be better understood. However, those skilled in the art can easily realize that some features can be omitted under different circumstances, or can be replaced by other components, materials, and methods. In some cases, some operations related to the present disclosure are not shown or described in the specification, such that the core part of the present disclosure is prevented from being overwhelmed by excessive descriptions. For those skilled in the art, it is not necessary to describe these operations in detail, and they can fully understand the relevant operations according to the descriptions in the specification and the general technical knowledge in the art.

In addition, the characteristics, operations, or features described in the specification may be combined in any appropriate manner to form various embodiments. Moreover, the steps or actions in the method description may also be changed or adjusted sequentially in a manner that is obvious to those skilled in the art. Therefore, the various orders in the specification and drawings are only for the purpose of clearly describing a particular embodiment and do not mean that they are in a necessary order unless it is otherwise stated that one of them must be followed.

The serial number itself for the parts in the present disclosure, such as "first", "second" and others is only used to distinguish the objects described and does not have any order or technical meaning. The terms "connection" and "linking" mentioned in the present disclosure, unless otherwise specified, include direct and indirect connections (links).

As shown in FIGS. 1-5, in an embodiment, a splicing pipe for installing a door or window includes a first frame profile 1, a heat insulation strip 2, a second frame profile 3 and at least two fasteners 5. The top of the heat insulation strip 2 is connected to the first frame profile 1, and the bottom of the heat insulation strip 2 is connected to the second frame profile 3. A first clamping groove 11 is formed on each of two sides of the first frame profile 1, and a second clamping groove 31 is formed on each of two sides of the second frame profile 3. The first clamping groove 11 and the second clamping groove 31 on the same side are both configured to be connected to a door or window having glass.

At least one of the first frame profile 1 and the second frame profile 3 on the same side is provided with an installation groove 13, and the fastener 5 is inserted into the installation groove 13. After the splicing pipe for installing the door or window is connected to the door or window 6, the fastener 5 is arranged between the door or window 6 and the splicing pipe, and the fastener 5 is configured to lock and fix the door or window 6.

Figure 6:
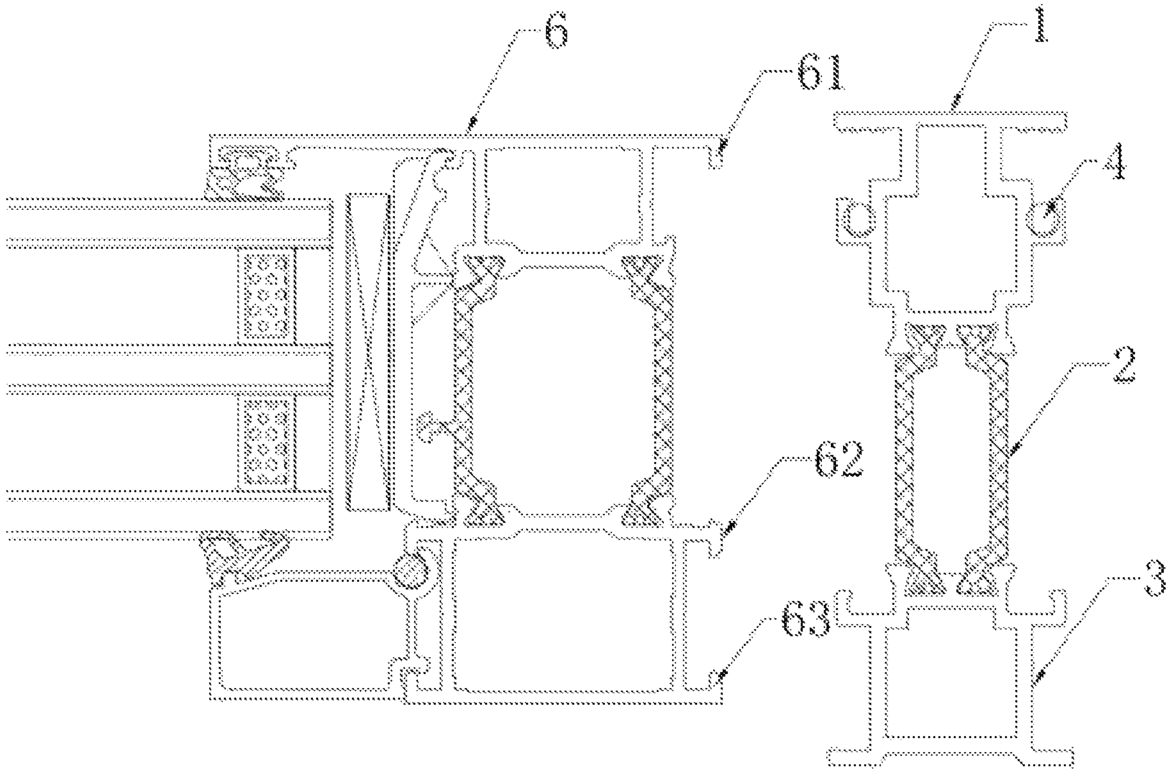
FIG. 6 is a structural schematic diagram before one side of the splicing pipe is installed with the door or window according to an embodiment of the present disclosure.
Figure 7:
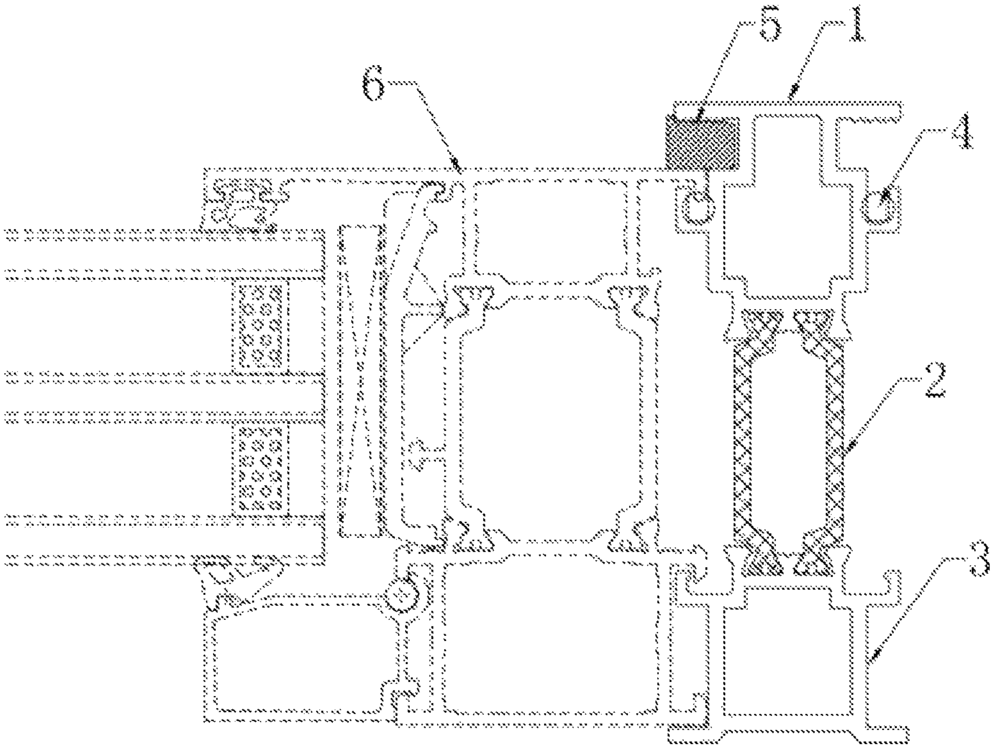
FIG. 7 is a structural schematic diagram showing that one side of the splicing pipe is installed with the door or window according to an embodiment of the present disclosure.
Figure 8:
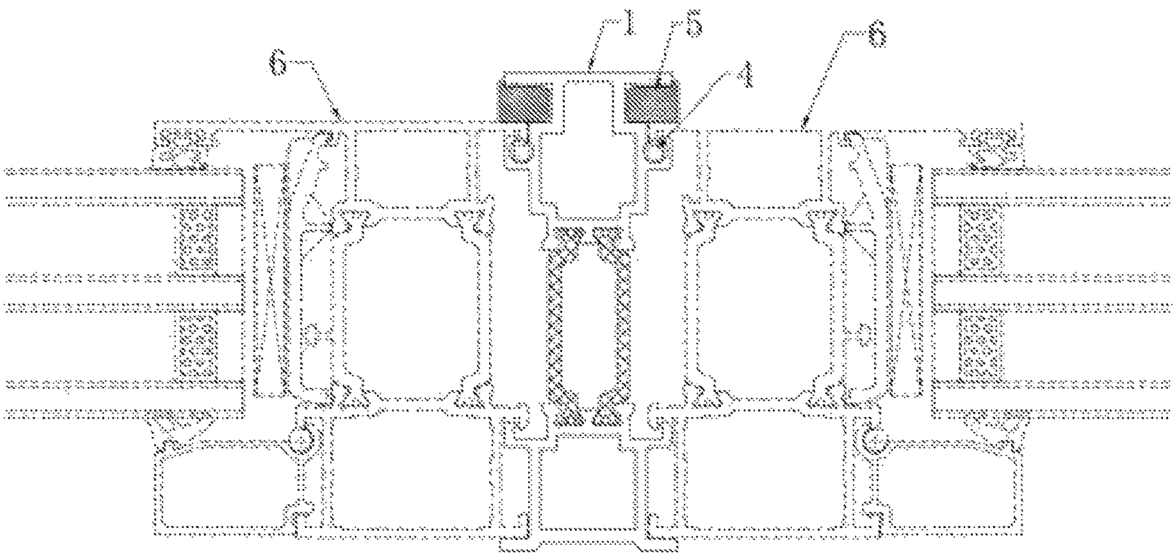
FIG. 8 is a structural schematic diagram showing that two sides of the splicing pipe are installed with the doors or windows according to an embodiment of the present disclosure.

The above-mentioned splicing pipe for installing the door or window, hereinafter referred to as the splicing pipe, is adopted. As shown in FIGS. 6-8, the left and right sides of the splicing pipe can be connected to the doors or windows having glass, that is, small doors or windows can be spliced together to obtain a large door or window 6. For example, four glass doors or windows of 1.5 m*3 m are connected to form a large glass door or window of about 6 m*3 m through three splicing pipes. When the doors or windows having glass are spliced, it is only necessary to connect the door or window 6 with the first clamping groove 11 and the second clamping groove 31 on the same side of the splicing pipe, which makes the splicing of the doors or windows on site more simple and efficient. The site refers to the vicinity of a building that needs to install the doors or windows having glass. The fastener 5 located in the installation groove 13 is arranged between the splicing pipe and the door or window 6, and can squeeze the door or window 6 to better connect the door or window 6 with the splicing pipe tightly, such that the door or window 6 is prevented from loosening after being used for a long time, and the service life of the door or window 6 is better guaranteed. After the door or window 6 is connected to the splicing pipe, the fastener 5 is inserted into the installation groove 13 to realize the splicing installation of the door or window 6. The splicing pipe can splice the glass-installed doors or windows 6, and the small doors or windows 6 can be subjected to standardized assembling in the factory, such that the performance of the doors or windows can be guaranteed. After the small glass-installed doors or windows 6 are transported to the site, there is no need to disassemble the glass, and the splicing is performed only through the splicing pipe. In this way, the splicing process on site is greatly simplified, and the splicing efficiency of the doors or windows on site is improved. The splicing pipe provided in the present disclosure has the advantages of simple splicing operation and easy implementation, which can not only improve the splicing speed, but also guarantee the performance of the doors or windows after being spliced. Even if the installation is performed by workers with different working abilities, the splicing can basically achieve the same performance.

The words "up", "down", "left", "right", "top" and bottom" mentioned in the present disclosure are only for the better description of the technical solution of the present disclosure and should not be understood as the limitations on the technical solution of the present disclosure.

The first frame profile 1 and the second frame profile 3 are made of aluminum alloy, which not only meets a certain support strength, but also has the advantage of light material. The first frame profile 1 and the second frame profile 3 have a hollow structure, which further reduces the weight of the splicing pipe.

An elastic sealing member 4 is arranged on at least one of the first clamping groove 11 and the second clamping groove 31 on the same side. The fastener 5 squeezes the elastic sealing member 4 for cooperation to strengthen the connection and fixation of the door or window 6.

Specifically, as shown in FIG. 1, the installation groove 13 is formed on each of two sides of the first frame profile 1, and the installation groove 13 is located above the first clamping groove 1. An opening of the first clamping groove 1 and an opening of the second clamping groove 3 are both arranged toward the top of the first frame profile 1 to facilitate the installation of the door or window 6. As shown in FIG. 6, a first clamping portion 61 and a second clamping portion 62 are correspondingly arranged on the side of the door or window 6 connected to the splicing pipe. The first clamping portion 61 is clamped and fixed on the first clamping groove 11, and the second clamping portion 62 is clamped and fixed on the second clamping groove 31. Preferably, the corresponding hook-like structure can be arranged on the clamping portion and/or the clamping groove, such that the clamping portion and the clamping groove can be clamped with each other more firmly.

The fastener 5 is a rectangular strip fastener with a rectangular cross-section. Correspondingly, the installation groove 13 is also a rectangular installation groove. In this way, when the fastener 5 is located on the installation groove 13, on the one hand, the fastener 5 is in relatively flat contact with the first frame profile 1 and the door or window 6 to facilitate the installation of the fastener 5 on site, and on the other hand, the fastener 5 has a better force to ensure the firmness of the connection between the door or window 6 and the splicing pipe. In other embodiments, the fastener 5 and the installation groove 13 can also be configured as strip fasteners with a polygonal or circular cross-section, but correspondingly, the installation contact area of the fastener 5 is small, which cannot better ensure the firmness of the connection between the door or window 6 and the splicing pipe, and leads to uneasy processing.

Since the fastener 5 is arranged between the top plate of the first frame profile 1 and the door or window 6 to provide the fastening and fixing function, the fastener 5 cannot be made from a material with a hollow structure, such as a foam strip, but a hard material. For example, the fastener 5 is made from polyvinyl chloride. At least one side of the first frame profile 1 in contact with the fastener 5 is provided with an engagement portion 14, and the engagement portion 14 is configured to be engaged and fixed with the fastener 5. Polyvinyl chloride not only has a certain hardness to meet the strength for locking and fixing, but also has a certain coefficient of expansion. In this way, after the fastener 5 is inserted into the installation groove 13, the engagement portion 14 will squeeze and deform the contact fastener 5, such that the fastener 5 is firmly installed to ensure the strength of the connection between the door or window 6 and the splicing pipe. Since the door or window 6 will be subjected to certain wind pressure vibration in the working environment and is required to be used for a long time, if the nut connection is employed, the nut will be loosened with the passage of time to loosen the connection between the door or window 6 and the splicing pipe, thereby leading to a great hidden danger. However, if the fastener 5 provided in the present disclosure is employed to realize the connection between the door or window 6 and the splicing pipe, the connection is firm to effectively prevent the door or window 6 and the splicing pipe from falling off, which increases the security.

Figure 4:
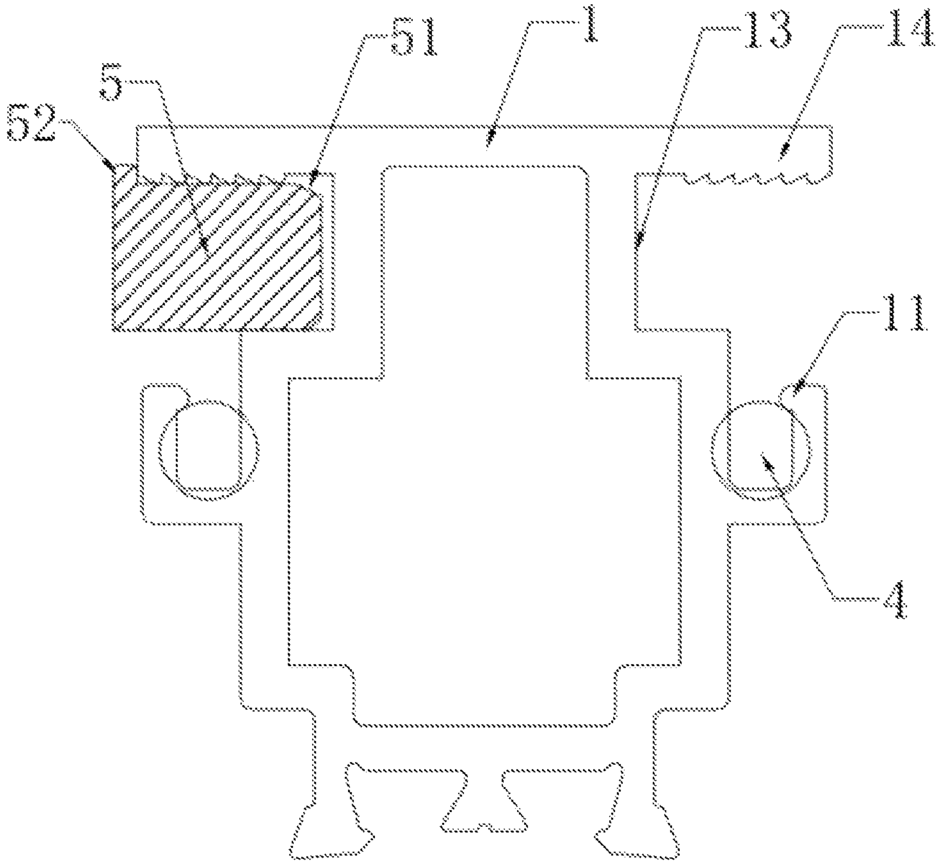
FIG. 4 is a schematic diagram of the local structure of the splicing pipe for installing the door or window according to an embodiment of the present disclosure.

As shown in FIG. 4, a limiting portion 52 is arranged on the fastener 5, and the limiting portion 52 is configured to limit the position of the fastener 5 relative to the first frame profile 1. After the limiting portion 52 is arranged, during the installation of the fastener 5, when the limiting portion 52 is in contact with the edge of the top plate of the first frame profile 1, the installer can immediately know that the fastener 5 is installed in place, and there is no need to continuously install by great force. This can not only improve the installation efficiency, but also avoid the damage on the splicing pipe caused by the excessive installation of the fastener 5. Specifically, a guide portion 51 may be arranged at one end of the fastener 5 inserted into the installation groove 13 to facilitate the installation and fixation of the fastener 5, and the limiting portion 52 is arranged at the other end of the fastener 5 to realize the positioning of the fastener 5.

As shown in FIGS. 1 and 6, a support plate 32 is arranged on each of two sides of the second frame profile 3. A third clamping portion 63 is arranged on the side of the door or window 6 connected to the splicing pipe, and the third clamping portion 63 of the door or window 6 abuts against the support plate 32. The first clamping groove 11, the second clamping groove 31 and the support plate 32 are arranged on the splicing pipe from top to bottom, which can better guarantee the installation of the splicing pipe and the door or window 6.

The elastic sealing member 4 is arranged in the first clamping groove 11. Although the fastener 5, the door or window 6 and the first frame profile 1 can achieve relatively close contact and have a certain tightness, the fastener 5 is configured to mainly focus on realizing the firm connection between the door or window 6 and the splicing pipe to prevent the door or window 6 from loosening or even falling off. Therefore, in order to ensure the tightness of the connection of the door or window 6, the elastic sealing member 4 is arranged in the first clamping groove 11 to more reliably guarantee the tightness of the connection of the splicing pipe.

The elastic sealing member 4 is a strip sealing member. In other embodiments, the elastic sealing member 4 may also include several segments, which are spaced or connected to form a strip to be placed in the first clamping groove 11. Alternatively, the elastic sealing member 4 may also be sheet-shaped, which is laid in the first clamping groove 11, and is in contact with and squeezed by the first clamping portion 61 on the door or window 6 to be deformed to realize the sealing effect. There are no specific limitations, as long as the elastic sealing member can achieve squeezing and deformation and be in close contact with the first clamping groove to achieve the sealing effect.

The elastic sealing member 4 is made of ethylene-propylene-diene monomer (EPDM), and EPDM has a certain elasticity and can be deformed under the action of force.

As shown in FIG. 7, after the elastic sealing member 4 is installed in the first clamping groove 11, the first clamping portion 61 of the door or window 6 is clamped and fixed in the first clamping groove 11, and simultaneously performs preliminary squeezing on the elastic sealing member 4. Subsequently, the fastener 5 is placed in the installation groove 13 to perform secondary squeezing on the door or window 6, such that the door or window 6 will again squeeze the elastic sealing member 4. As a result, the elastic sealing member 4 will achieve a large degree of deformation and be fully in contact with the first clamping groove 11 to better guarantee the tightness of the connection of the splicing pipe. Moreover, the fastener 5 and the elastic sealing member 4 cooperate with each other to further strengthen the firmness of the connection between the door or window 6 and the splicing pipe.

In other embodiments, three or four fasteners may also be provided, and correspondingly, three or four elastic sealing members 4 and installation grooves 13 may be provided. For example, the left and right sides of the first frame profile 1 and the left and right sides of the second frame profile 3 are respectively provided with the installation grooves 13, and the fasteners 5 are respectively inserted into the installation grooves 13. The elastic sealing members 4 are respectively arranged in the first clamping grooves 11 of two sides of the first frame profile 1, and the elastic sealing members 4 are respectively arranged on the second clamping grooves 31 on two sides of the second frame profile 3. As a result, as shown in FIG. 1, openings of the first clamping grooves 11 of the first frame profile 1 are arranged upward, and the installation grooves 13 are located above the first clamping grooves 11. Openings of the second clamping grooves 31 of the second frame profile 3 are arranged downward, and the installation grooves 13 are located below the second clamping grooves 31 (not shown) to facilitate the installation of the door or window 6. For another example, two installation grooves, two elastic sealing members 4 and two fasteners 5 are provided. The left and right sides of the second frame profile 3 are respectively provided with the installation grooves, and openings of the second clamping grooves 31 of the second frame profile 3 are arranged downward. The elastic sealing members 4 are respectively located in the second clamping grooves 31. After the door or window 6 and the splicing pipe are connected, the fastener 5 is inserted between the door or window 6 and the bottom plate of the second frame profile 3 (not shown, in this case, the structure of the second frame profile 3 is equivalent to the structure of the first frame profile 1 in FIG. 1 after being rotated by 180°). For another example, the corresponding installation groove 13, elastic sealing member 4 and fastener 5 are arranged on one side of the first frame profile 1, and the corresponding installation groove 13, elastic sealing member 4 and fastener 5 are arranged on one side of the second frame profile, where the installation groove of the first frame profile 1 and the installation groove of the second frame profile 3 are located on different sides.

In other embodiments, the bottom of the first frame profile 1 is provided with a first installation portion 12, which is detachably connected to the top of the heat insulation strip 2 in a concave-convex fit manner. The top of the second frame profile 3 is provided with a second installation portion 33, which is detachably connected to the bottom of the heat insulation strip 2 in a concave-convex fit manner. The first frame profile 1 and the second frame profile 3 are both detachably connected to the heat insulation strip 2, which makes the scope of application of the splicing pipe more flexible. When the doors or windows 6 of different types are installed, they mainly have a change in height, such that only the heat insulation strips 2 corresponding to different heights need to be replaced, and the first frame profile 1 and the second frame profile 3 do not need to be replaced and are still used on the doors or windows 6 of different types.

Figure 9:
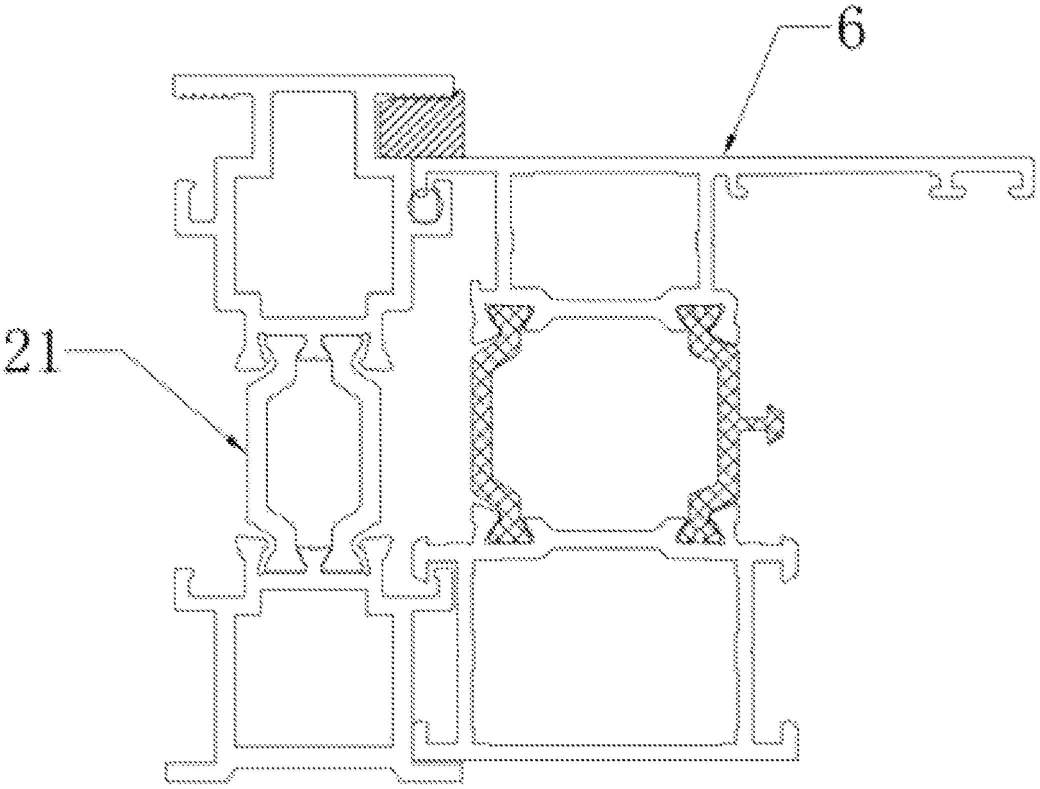
FIG. 9 is a structural schematic diagram showing that the door or window is installed by using the first-type heat insulation strip according to an embodiment of the present disclosure.
Figure 10:
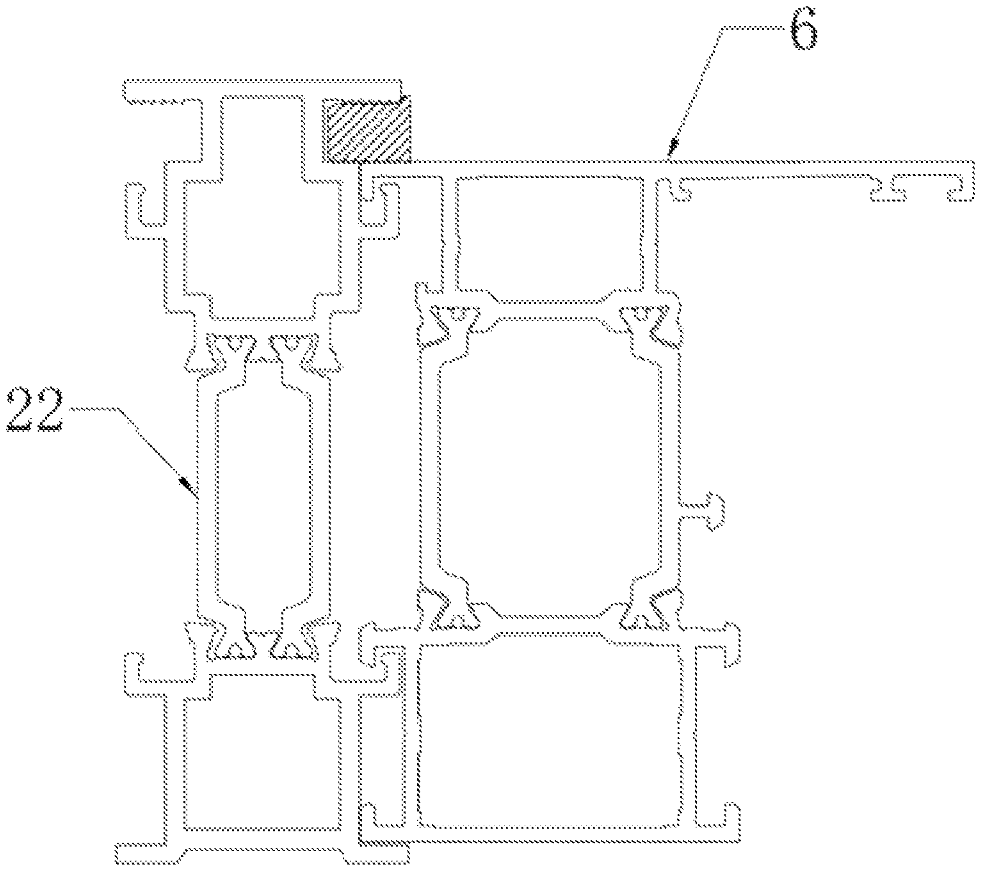
FIG. 10 is a structural schematic diagram showing that the door or window is installed by using the second-type heat insulation strip according to an embodiment of the present disclosure.
Figure 11:
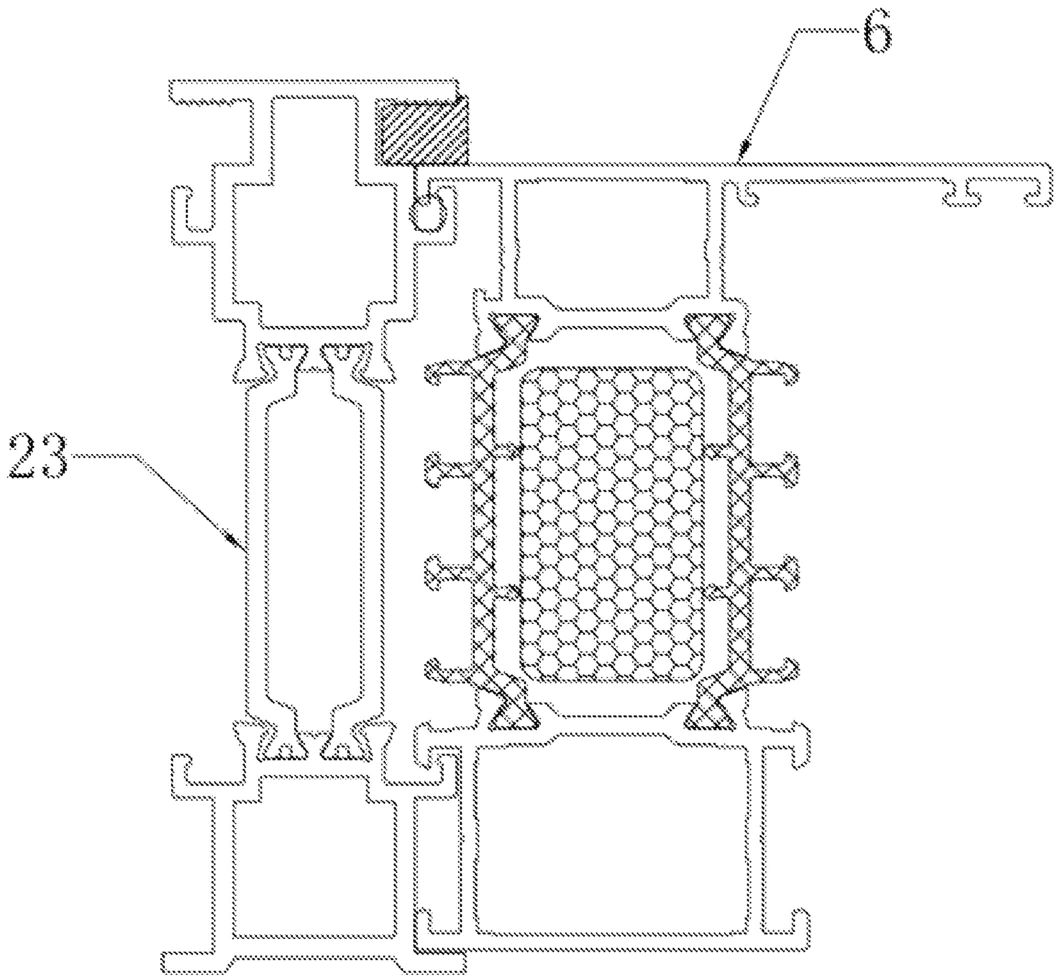
FIG. 11 is a structural schematic diagram showing that the door or window is installed by using the third-type heat insulation strip according to an embodiment of the present disclosure.

For the specific use of the splicing pipe of the present disclosure, the heat insulation strip 2 with a height of 18-63 mm can be used, and correspondingly, the door or window of 58-100 series can be installed. For example, as shown in FIG. 9, the first-type heat insulation strip 21 with a height of 24 mm is adopted, and correspondingly, the door or window 6 of 61 series is installed. For example, as shown in FIG. 10, the second-type heat insulation strip 22 with a height of 33 mm is adopted, and correspondingly, the door or window 6 of 70 series is installed. For another example, as shown in FIG. 11, the third-type heat insulation strip 23 with a height of 41 mm is adopted, and correspondingly, the door or window 6 of 78 series is installed. The detachable connection mode not only realizes the more flexible application of the splicing pipe, but also saves the material cost.

Figure 5:
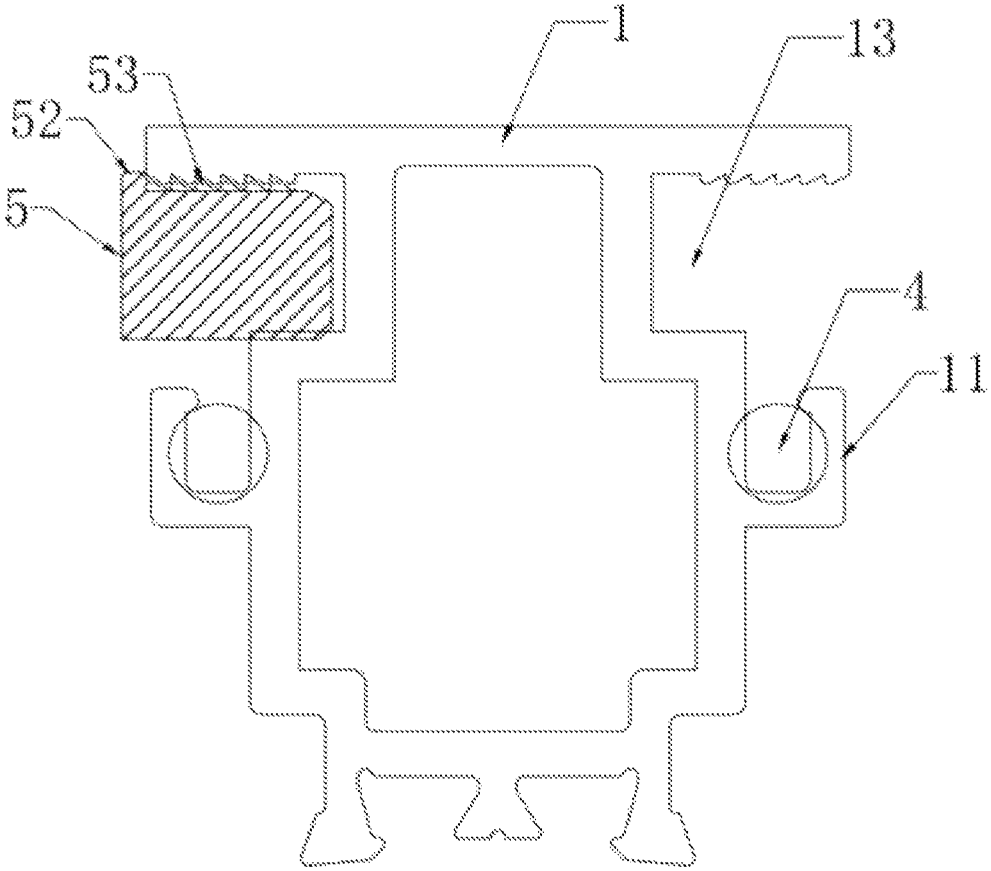
FIG. 5 is a schematic diagram of the local structure of the splicing pipe for installing the door or window according to another embodiment of the present disclosure.

In an embodiment, the bottom of the top plate of the first frame profile 1 has a large enough area to provide the engagement portion 14, so the bottom of the top plate of the first frame profile 1 is provided with the engagement portion 14. As shown in FIG. 4, the engagement portion 14 is serrated. As shown in FIG. 5, both the first frame profile 1 and the fastener 5 can also be provided with a fastener engagement portion 53. Alternatively, the first frame profile 1 and the fastener 5 are in a concave-convex fit. Actually, when a plurality of engagement portions are provided or the concave-convex fit is adopted, although the fastener 5 can be fixed, the improved effect is negligible compared with that the bottom of the top plate of the first frame profile 1 is only provided with the engagement portion 14, and the material processing will be obviously troublesome.

Figure 12:
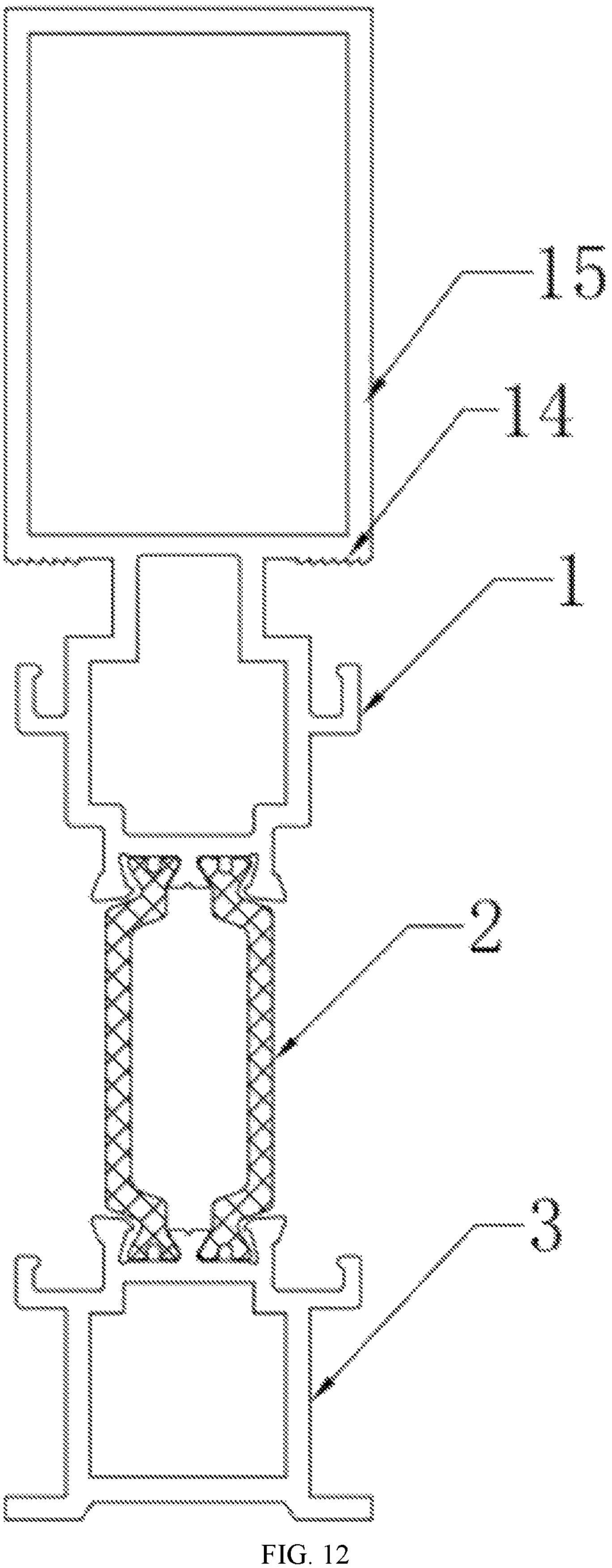
FIG. 12 is a structural schematic diagram of a splicing pipe for installing a door or window according to another embodiment of the present disclosure.

In an embodiment, as shown in FIG. 12, a reinforcement frame 15 is arranged on the top of the top plate of the first frame profile 1. The height of the conventional glass door or window 6 is less than 2.5 m, and the designed splicing pipe meets the service strength. However, for larger a door or window 6, such as a glass door or window 6 with a height of 2.5-3 m, the requirement of the connection strength of the splicing pipe increases, so the reinforcement frame 15 is arranged to increase the connection strength of the splicing pipe.

Figure 13:
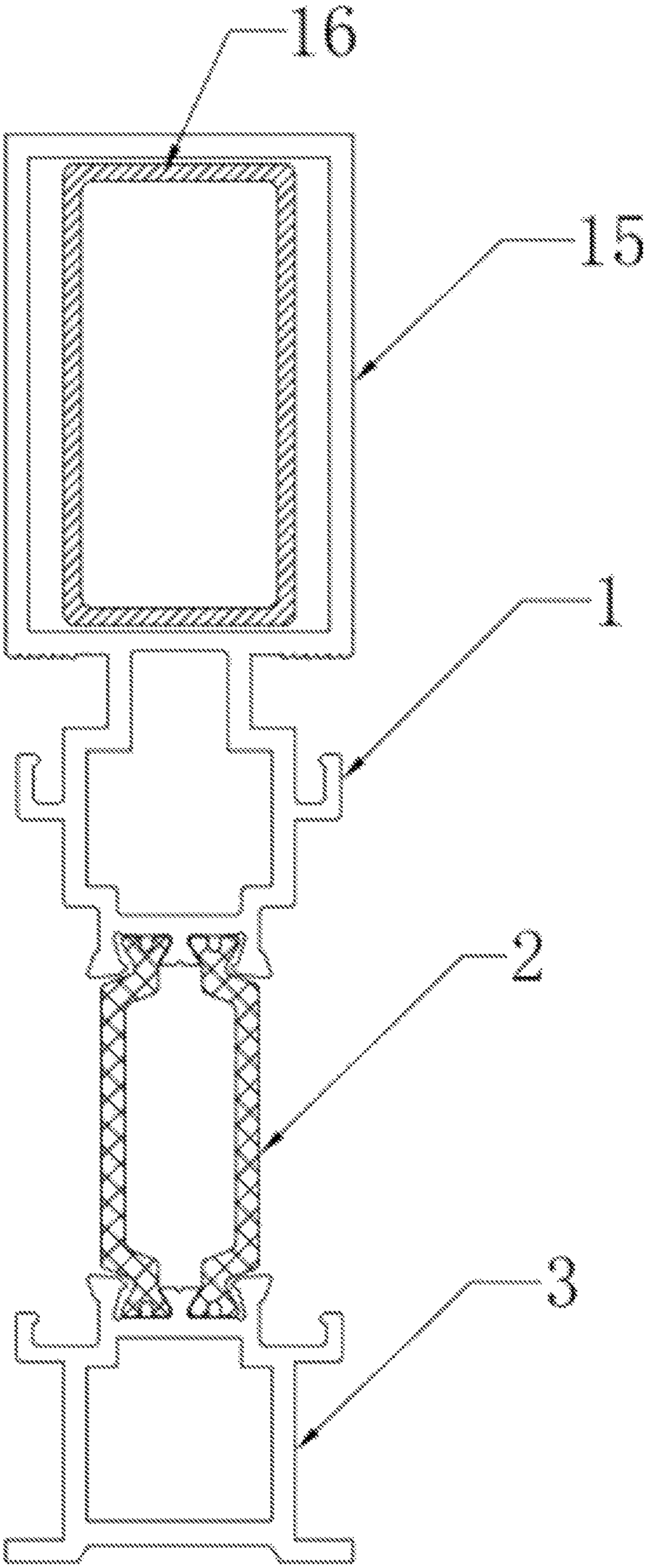
FIG. 13 is a structural schematic diagram of a splicing pipe for installing a door or window according to yet another embodiment of the present disclosure.

Preferably, in an embodiment, as shown in FIG. 13, a supporting member 16 is arranged in the reinforcement frame 15, and the supporting member 16 is in contact with the reinforcement frame 15 to increase the structural strength of the reinforcement frame 15. For the plateau or areas where typhoons often occur, if there is a large wind pressure or special strength requirements, the supporting member 16 is arranged in the reinforcement frame 15 to further increase the anti-wind pressure performance of the splicing pipe after the door or window 6 is installed. The supporting member 16 is a steel lining, ribbed plate and other structures, and there are no specific limitations. Furthermore, the reinforcement frame 15 is a rectangular frame with end covers at both ends, such that the reinforcement frame 15 forms a relatively closed frame body, and a sealing layer is arranged on the end covers to ensure the tightness in the reinforcement frame 15, prevent rust and prolong the service life of the splicing pipe.

The above specific examples are used to illustrate the present disclosure, which are only used to help understand the present disclosure and do not limit the present disclosure. For those skilled in the art, some simple deductions, deformations or replacements may be made according to the ideas of the present disclosure.

A splicing pipe for installing a door or window includes a first frame profile, a second frame profile, a heat insulation strip and at least two fasteners. A first clamping groove is formed on each of two sides of the first frame profile, and a second clamping groove is formed on each of two sides of the second frame profile. The first clamping groove and the second clamping groove are both configured to be connected to the door or window having glass. At least one of the first frame profile and the second frame profile on the same side is provided with an installation groove, and the fastener is inserted into the installation groove. After the splicing pipe is connected to the door or window, the fastener is arranged between the door or window and the splicing pipe, and the fastener is configured to lock and fix the door or window. The fastener is configured to connect the door or window with the splicing pipe tightly. After small glass-installed doors or windows are transported to the site, there is no need to disassemble the glass, and the splicing is performed only through the splicing pipe. In this way, the splicing process on site is greatly simplified, and the splicing efficiency is improved. The splicing pipe provided has the advantages of simple splicing operation and easy implementation, which can not only improve the splicing speed, but also guarantee the performance of the doors or windows after being spliced.

What is claimed is:

1. A splicing pipe for installing a door or window, comprising a first frame profile, a second frame profile, a heat insulation strip and at least two fasteners; wherein a top of the heat insulation strip is connected to the first frame profile, and a bottom of the heat insulation strip is connected to the second frame profile;

a first clamping groove is formed on each of two sides of the first frame profile, and a second clamping groove is formed on each of two sides of the second frame profile; and the first clamping groove and the second clamping groove on a same side are both configured to be connected to the door or window having glass; and at least one of the first frame profile and the second frame profile on the same side is provided with an installation groove, and the fastener is inserted into the installation groove; after the splicing pipe is connected to the door or window, the fastener is arranged between the door or window and the splicing pipe, and the fastener is configured to lock and fix the door or window;

wherein at least one side of the first frame profile in contact with the fastener is provided with an engagement portion, and the engagement portion is configured to be engaged and fixed with the fastener; the engagement portion is serrated; a limiting portion is arranged on the fastener, and the limiting portion is configured to limit a position of the fastener relative to the first frame profile.

2. The splicing pipe for installing the door or window according to claim 1, wherein an elastic sealing member is arranged on at least one of the first clamping groove and the second clamping groove on the same side; the fastener squeezes the elastic sealing member for cooperation to strengthen connection and fixation of the door or window.

3. The splicing pipe for installing the door or window according to claim 2, wherein the elastic sealing member is a strip sealing member.

4. The splicing pipe for installing the door or window according to claim 2, wherein the installation groove is formed on each of two sides of the first frame profile, and the installation groove is located above the first clamping groove; and an opening of the first clamping groove and an opening of the second clamping groove are both arranged toward a top of the first frame profile.

5. The splicing pipe for installing the door or window according to claim 4, wherein a support plate is arranged on each of two sides of the second frame profile, and the door or window abuts against the support plate.

6. The splicing pipe for installing the door or window according to claim 1, wherein the fastener is a rectangular strip fastener.

7. The splicing pipe for installing the door or window according to claim 1, wherein a bottom of a top plate of the first frame profile is provided with the engagement portion, and a reinforcement frame is arranged on a top of the first frame profile.

8. The splicing pipe for installing the door or window according to claim 7, wherein a supporting member is arranged in the reinforcement frame, and the supporting member is in contact with the reinforcement frame to increase a structural strength of the reinforcement frame.

* * * * *